United States Patent [19]

Macey et al.

[11] Patent Number: 4,644,820
[45] Date of Patent: Feb. 24, 1987

[54] GEARED-NEUTRAL CONTINUOUSLY VARIABLE TRANSMISSION

[75] Inventors: James P. Macey, Birmingham; Hamid Vahabzadeh, Rochester Hills, both of Mich.

[73] Assignee: General Motors Corporation, Detroit, Mich.

[21] Appl. No.: 825,153

[22] Filed: Feb. 3, 1986

[51] Int. Cl.⁴ .............................................. F16H 37/00
[52] U.S. Cl. ...................................... 74/689; 74/681; 74/687; 74/690
[58] Field of Search ................ 74/674, 681, 689, 705, 74/793, 690, 687, 691

[56] References Cited

U.S. PATENT DOCUMENTS

| | | | |
|---|---|---|---|
| 3,552,232 | 1/1971 | Kress | 74/689 |
| 3,714,846 | 2/1973 | Louis et al. | 74/687 |
| 4,290,320 | 9/1981 | Abbott | 74/689 |
| 4,402,237 | 9/1983 | Tomlinson | 74/689 |
| 4,553,450 | 11/1985 | Gizard | 74/689 |

FOREIGN PATENT DOCUMENTS 2108599  5/1983  United Kingdom .................. 74/691

*Primary Examiner*—Leslie Braun
*Assistant Examiner*—Dwight G. Diehl
*Attorney, Agent, or Firm*—Donald F. Scherer

[57] ABSTRACT

A geared neutral continuously variable transmission has a variable ratio belt drive, a fixed ratio drive and a planetary gear set. The fixed ratio drive is selectively connectible with the transmission input by a friction clutch and with the planetary gear set by another friction clutch. A one-way clutch is disposed in parallel drive relation with the other friction clutch. When the fixed drive ratio is not transmitting torque, it can be effectively removed from the drive path to increase efficiency and reduce noise generation by disengaging the friction clutches.

3 Claims, 2 Drawing Figures

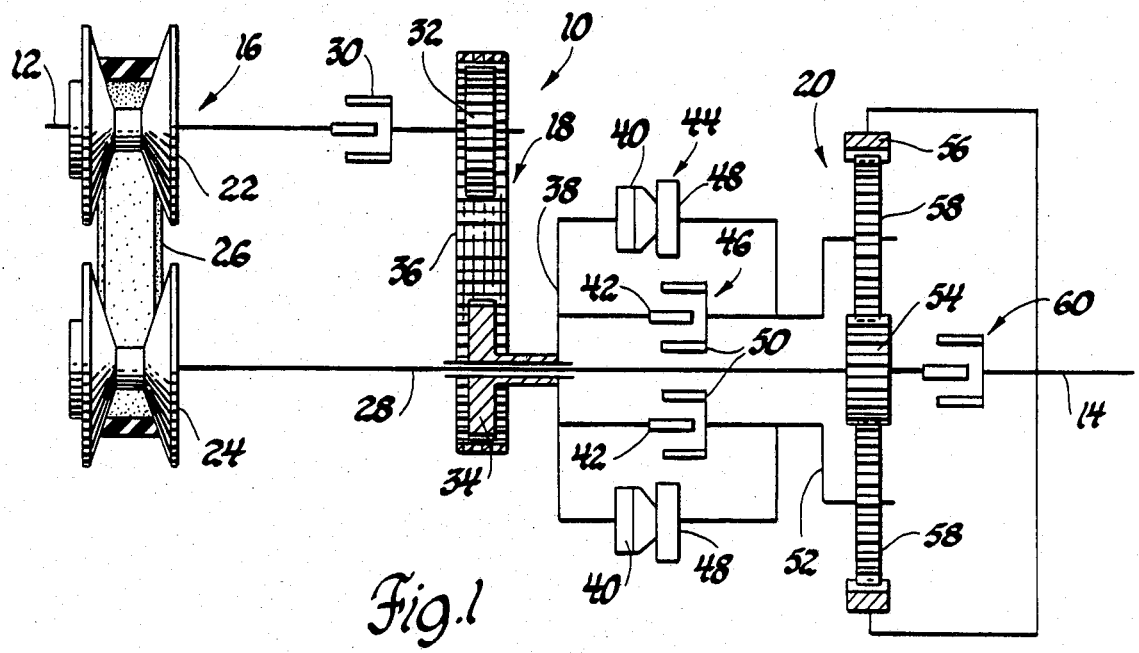

4,644,820

GEARED-NEUTRAL CONTINUOUSLY VARIABLE TRANSMISSION

This invention relates to power transmissions and more particularly to geared neutral continuously variable power transmissions.

BACKGROUND OF THE INVENTION

Prior art power transmissions utilizing continuously variable friction drives, such as V-belt drives, in parallel with a chain or other fixed ratio drive, to provide a geared neutral transmission are well-known. Such a transmission is shown in British Pat. No. 2,045,368 published Dec. 8, 1982. In such transmissions, the fixed ratio drive is drivingly connected between the input and one planetary gear member while the variable ratio friction drive is drivingly connected between the input and another member of the planetary gear set. The third member of the planetary gear set drives the transmission output.

It is well-known that controlling the relative speeds of the members of a planetary gear set can result in zero output speed while the other two members of the planetary gear set are rotating. Hence, the planetary is in neutral, thus the term "geared neutral".

In the prior art transmissions, the fixed ratio mechanism has been constructed to be continuously drivingly connected to the planetary gear set. Thus, the fixed ratio mechanism is continuously rotating during all phases of operation. Such rotation causes a reduction in overall transmission efficiency and an increase in system noise.

SUMMARY OF THE INVENTION

The present invention overcomes the disadvantage of the prior art by providing selectively operable friction clutches connected to the input and output of the fixed ratio drive, respectively. To effectively remove the fixed ratio drive from the power transmission path, both of the friction clutches are disengaged. The present invention also provides a one-way clutch mechanism in parallel with the friction clutch disposed on the output side of the fixed ratio drive. This one-way clutch permits the first forward drive mode to be selected with the engagement of only the friction clutch disposed on the input side of the fixed ratio drive.

It is therefore an object of this invention to provide an improved continuously variable power transmission system of the geared neutral type wherein the fixed ratio mechanism can be removed from the transmission drive path by operation of a pair of disengageable clutches disposed at the input and output, respectively, of the fixed ratio mechanism.

It is a further object of this invention to provide an improved continuously variable power transmission of the geared neutral type having an input shaft and an output shaft with a variable ratio friction drive, a fixed ratio drive and a planetary gear arrangement operatively connected between the shafts wherein the planetary gear arrangement is connected to both the variable ratio drive and a fixed ratio drive in low speed forward and reverse drive modes and wherein the fixed ratio drive is disengaged from both the input shaft and the planetary gear arrangement in a high speed forward range mode.

These and other objects and advantages of the present invention will be more apparent from the following description of the drawings.

In the Drawings

FIG. 1 is a schematic representation of a continuously variable power transmission; and FIG. 2 is a chart depicting the operating condition of the clutches which control the transmission of FIG. 1.

Referring to the drawings, there is seen in FIG. 1 a continuously variable transmission of the geared neutral type generally designated 10. This transmission incorporates an input shaft 12, an output shaft 14, a variable ratio belt drive 16, a fixed ratio chain drive 18, and a planetary gear set 20. The variable ratio belt drive 16 and fixed ratio chain drive 18 are operatively connected in parallel driving relation between the input shaft 12 and the planetary gear set 20. The planetary gear set 20 is drivingly connected with the output shaft 14.

The variable belt drive 16 is a conventional drive unit having an input 22 and a output 24 drivingly interconnected by member 26. The variable drive is controlled in a conventional manner such that the drive ratio therebetween can be varied from a maximum underdrive condition to a maximum overdrive condition. The variable input 22 is continuously drivingly connected to the input shaft 12 while the variable output 24 is continuously drivingly connected to a variable output shaft 28.

The input shaft 12 is continuously drivingly connected to the input side of a selectively engageable friction clutch 30, the output side of which is connected to a sprocket 32 which is the input member for the fixed ratio chain drive 18.

The fixed ratio chain drive 18 also includes an output sprocket 34 and a flexible chain mechanism 36 which drivingly connects the input sprocket 32 with the output sprocket 34. The output sprocket 34 is drivingly connected with a hub member 38.

The hub member 38 is drivingly connected with the input members 40 and 42 of a one-way clutch 44 and a friction clutch 46, respectively. The output members 48 and 50 of the one-way clutch 44 and friction clutch 46 are both drivingly connected with a planetary carrier member 52 which is a component of the planetary gear set 20.

The planetary gear set 20 also includes a sun gear 54 drivingly connected with the shaft 28, a ring gear 56 drivingly connected with the output shaft 14 and a plurality of pinion gears 58 meshing with the sun gear 54 and ring gear 56 and being rotatably mounted on the carrier 52. A direct friction clutch 60 is selectively operable to provide a direct drive connection between the output pulley 24 of the variable belt drive 16 and the transmission output shaft 14.

The friction clutches 30, 46 and 60 may be constructed in accordance with any of the well-known selectively engageable friction clutch mechanisms. These clutches can be engaged and controlled in a well-known manner using conventional mechanisms. These clutches may be fluid operated, mechanically operated or electrically operated. The operation and control of such devices is well-known in the transmission art. The one-way clutch mechanism 44 may be constructed in accordance with the conventional one-way drive mechanisms.

The input shaft 12 is connected with a prime mover such as a gasoline engine (not shown), and the output shaft 14 is drivingly connected to the driving wheels (not shown) of a passenger vehicle. Such drive mechanisms and prime movers are well-known in the art such that further description of them and their operation is not believed necessary.

With the transmission input shaft 12 being rotated by the prime mover, the variable belt drive 16 will cause rotation of the sun gear 54. The speed of sun gear 54 relative to the input shaft 12 is determined by the ratio established in the variable belt drive 16. With the clutch 30 engaged, the input members 40 and 42 of the one-way clutch 44 and friction clutch 46 will be rotated at a speed relative to the transmission input shaft determined by the drive ratio of the fixed ratio chain drive 18.

With the sun gear 54 being rotated and the ring gear being held stationary by the reaction of the vehicle on shaft 14, the carrier 52 will rotate in the same direction as the sun gear 54 at a ratio determined by the number of teeth on the sun gear 54 and the ring gear 56. By selecting the proper ratio in the variable belt drive 16, the input and output members of the one-way clutch 44 and friction clutch 46 will be rotating at the same speed. However, since the transmission output 14 is not rotating, the transmission is considered to be in neutral and the friction clutch 46 can be engaged or disengaged as desired. Assuming the DRIVE 1 condition, as shown in FIG. 2 is desired, the friction clutch 46 is disengaged.

If, at this time, the ratio in the variable belt drive 16 is reduced toward maximum underdrive, the transmission operates in the first forward mode. The sun gear 54 will be reduced in speed while the carrier 52 will be driven at a speed equal to the output speed of fixed ratio 18 through the one-way clutch 44. In this instance, the output shaft 14 will rotate in the same direction as the input shaft 12 but at a much reduced speed. The variable belt drive becomes a rotating reaction during this operation.

When the variable belt drive 16 reaches the maximum underdrive ratio, the sun gear 54, carrier 52 and ring gear 56 will be rotating at the same speeds. Those familiar with these types of transmissions will recognize this is possible due to various ratios that are present in the belt drive, the chain drive and the planetary gear set.

At this point of operation, the clutch 60 can be engaged under synchronous conditions since the speed of shaft 14 and sun gear 54 are identical. Further increase in the variable ratio after engagement of clutch 30, will cause clutch 44 to overrun and all drive forces will be transmitted through the variable drive. The transmission is now operating in the high forward mode, shown as DRIVE 2 in FIG. 2. At the same time, the clutch 30 may be disengaged such that the fixed drive will not be rotating. To increase the drive speed, the drive ratio of the variable belt drive 16 can be increased toward the maximum overdrive condition thus resulting in an increase in vehicle speed. Operation of the transmission back to a neutral condition is accomplished by reversing the foregoing operations.

At the geared-neutral condition, and also during Mode I operation, the friction clutch 46 can be engaged. This will provide a positive drive connection between the output sprocket 34 and the planet carrier 52. Operation of the transmission in the forward direction is accomplished in a manner similar to that described above when the one-way device 44 was operable. The shift from the LOW range to the DRIVE 2 range is accomplished in a similar manner, the clutch 60 being engaged. However, to further increase the forward speed, both clutches 30 and 46 will be disengaged. It should be evident that in the high forward speed operating range, the fixed ratio chain drive 18 is removed from the drive path and thus does not provide efficiency loss and noise generation during the high forward speed operation. The one-way device 44, during overrun, has low friction characteristics similar to an antifriction bearing.

From the geared-neutral condition with both clutches 30 and 46 engaged, the transmission can be operated in a reverse direction by increasing the drive ratio of the variable belt drive 16 toward the maximum overdrive condition. A ratio change of the variable belt drive 16 in this direction will result in an increase in the speed of sun gear 54. The speed of carrier 52 is controlled by the fixed ratio chain drive 18 and will remain constant. With the sun gear speed increasing, the speed of ring gear 56 will increase but in a negative or reverse direction. Since the ring gear 56 is rotating reversely relative to the input shaft 12, the output shaft 14 will rotate in reverse. The reverse speed of transmission output shaft 14 is determined by the ratio in the variable belt drive 16 and the speed of input shaft 12.

During neutral operation, it is seen from the chart in FIG. 2 that the clutches 46 and 30 may be engaged or disengaged as desired. A positive neutral is provided if clutch 30 is disengaged. In the REVERSE drive clutches 46 and 30 must be engaged and in the LOW drive range, clutches 46 and 30 must be engaged. The DRIVE 1 range which is identical to the LOW range, from a ratio standpoint, is accomplished through the engagement of clutch 30 and the operation of the one-way device 44. The DRIVE 2 range is accomplished through the engagement of clutch 60. During the DRIVE 2 range or high forward speed range, the one-way clutch 44 overruns. This permits relatively less complicated ratio interchange to occur between DRIVE 1 and DRIVE 2 when compared to the ratio interchange between DRIVE 2 and LOW. However, the DRIVE 1 range does not provide engine braking should that condition be desirable while both the LOW and REVERSE ranges do provide engine braking. Engine braking is also available in the DRIVE 2 range.

As previously mentioned, the fixed ratio chain drive 18 is effectively removed from the drive path during the DRIVE 2 or high forward speed range thus improving the overall operating efficiency and reducing the noise generation of the transmission. The fixed ratio drive 18 is depicted and described as a chain drive mechanism, however, a positive drive mechanism such as intermeshing gears can also be utilized. The variable ratio drive is shown as a flexible belt drive, however, other variable ratio friction drives can be used within the scope of the invention. Likewise, combining type gear arrangements other than coaxial planetary units can be incorporated into the transmission defined by the present invention.

The embodiments of the invention in which an exclusive property or privilege is claimed are defined as follows:

1. A continuously variable transmission comprising; input drive means; output drive means, a variable ratio friction belt drive means drivingly connected to said input drive means and including a driven shaft; fixed ratio drive means having an input shaft and an output shaft; selectively engageable first clutch means for connecting said input drive means to said input shaft; planetary gear means having a sun gear connected to said driven shaft, a ring gear drivingly connected with said output drive means and carrier and pinion gear means drivingly connected between said sun gear and said ring gear; second clutch means being selectively engageable for connecting said sun gear to said output drive means; third clutch means being selectively engageable for connecting said output shaft to said carrier and pinion gear means; and oneway clutch means disposed in parallel drive relation with said third clutch means for transmitting torque to said carrier and pinion gear means when said third clutch means is disengaged and said output shaft is attempting to rotate faster than said carrier and pinion gear means.

2. A continuously variable transmission comprising; input drive means; output drive means, a variable ratio friction drive means drivingly connected to said input drive means and including a variable input means, a variable output means and a driven shaft connected with the variable output means; fixed ratio drive means having an input shaft and an output shaft; selectively engageable first clutch means for connecting said input drive means to said input shaft; planetary gear means having a sun gear connected to said driven shaft, a ring gear drivingly connected with said output drive means and carrier and pinion gear means drivingly connected between said sun gear and said ring gear; second clutch means being selectively engageable for connecting said sun gear to said output drive means; and third clutch means being selectively engageable for connecting said output shaft to said carrier and pinion gear means, said first and third clutch means being engaged to provide a low forward drive range and said second clutch means being engaged to provide a high forward drive range.

3. A continuously variable transmission comprising; input drive means; output drive means, a variable ratio friction drive means drivingly connected to said input drive means and including a driven shaft; fixed ratio drive means having an input shaft and an output shaft; selectively engageable first clutch means for connecting said input drive means to said input shaft; combining gear means having a first gear means connected to said driven shaft, a second gear means drivingly connected with said output drive means and third gear means drivingly connected between said first gear means and said second gear means; second clutch means being selectively engageable for connecting said first gear means to said output drive means; third clutch means being selectively engageable for connecting said output shaft to said third gear means; and one-way clutch means disposed in parallel drive relation with said third clutch means for transmitting torque to said third gear means when said third clutch means is disengaged and said output shaft is attempting to rotate faster than said third gear means.

* * * * *